United States Patent
Chandra et al.

(10) Patent No.: US 11,980,245 B2
(45) Date of Patent: May 14, 2024

(54) METHODS AND SYSTEMS FOR IMPROVED MANUFACTURING OF OFF-THE-RACK, TAILORED AND/OR CUSTOMIZED CLOTHING

(71) Applicant: Project My Dress, LLC, Atherton, CA (US)

(72) Inventors: Donna Chandra, Atherton, CA (US); Jennifer Youstra, Portola Valley, CA (US)

(73) Assignee: Jennifer Youstra, Portola Valley, CA (US)

( * ) Notice: Subject to any disclaimer, the term of this patent is extended or adjusted under 35 U.S.C. 154(b) by 326 days.

(21) Appl. No.: 17/445,715

(22) Filed: Aug. 23, 2021

(65) Prior Publication Data
US 2022/0053863 A1     Feb. 24, 2022

Related U.S. Application Data

(60) Provisional application No. 63/069,513, filed on Aug. 24, 2020.

(51) Int. Cl.
*A41H 3/00*      (2006.01)
*G05B 19/042*    (2006.01)

(52) U.S. Cl.
CPC .......... *A41H 3/007* (2013.01); *G05B 19/042* (2013.01); *G05B 2219/23012* (2013.01)

(58) Field of Classification Search
CPC .................. A41H 3/007; G05B 19/042; G05B 2219/23012
USPC .................................................. 700/130–132
See application file for complete search history.

(56) References Cited

U.S. PATENT DOCUMENTS

| | | | | |
|---|---|---|---|---|
| 6,353,770 B1 * | 3/2002 | Ramsey | ................ | A41H 3/007 33/15 |
| 6,546,309 B1 * | 4/2003 | Gazzuolo | ................ | G06T 17/20 702/167 |
| 7,617,016 B2 * | 11/2009 | Wannier | ................ | A41H 3/007 705/26.1 |
| 2004/0078285 A1 * | 4/2004 | Bijvoet | .................... | A41H 1/00 702/167 |
| 2004/0153195 A1 * | 8/2004 | Watanabe | .............. | A41H 3/007 700/132 |
| 2005/0022708 A1 * | 2/2005 | Lee | ........................ | G06Q 30/02 112/186 |
| 2008/0312765 A1 * | 12/2008 | Gardiner | ................ | G06T 19/00 700/132 |
| 2009/0222127 A1 * | 9/2009 | Lind | .................. | G06Q 30/0601 705/26.1 |
| 2017/0039775 A1 * | 2/2017 | Applegate | ................ | G06T 7/30 |

* cited by examiner

*Primary Examiner* — Nathan E Durham
(74) *Attorney, Agent, or Firm* — Novel IP

(57) ABSTRACT

Methods and systems for the improved manufacturing of off-the-rack, tailored and/or customized clothing include a dual-sizing chart, dual-sizing pattern making process, dual-sized pattern, dual-sizing garments, manufacturing interface, dual-sizing ordering and marketing process, dual-sizing ordering interface, dual-sizing conversion process, dual-sized garment (for example a dress, pant suit, shapewear or one-piece swimsuit, romper, or jumper), and a dual-sizing manufacturing process.

21 Claims, 20 Drawing Sheets

| Dual Sizing Chart | | | | | |
|---|---|---|---|---|---|
| Size on Top 202 | | | | | |
| (All measurements in inches) | 8 | 10 | 12 | 14 | 16 |
| Bust | 35 | 37 | 39 | 40 | 42 |
| Size on Bottom 204 | | | | | |
| (All measurements in inches) | 8 | 10 | 12 | 14 | 16 |
| Hip | 39 1/4 | 40 1/4 | 41 3/4 | 43 1/4 | 45 |
| Note: Shaded area reflects variants that can be modified. | | | | | |

FIG. 2

Customer Facing Web Site

| Dual Sizing Chart | | | | | |
|---|---|---|---|---|---|
| Size on Top (All measurements in inches) | | | | | 306 |
| | 8 | 10 | 12 | 14 | 16 |
| Bust | 35 | 37 | 39 | 40 | 42 |
| Size on Bottom (All measurements in inches) | | | | | |
| | 8 | 10 | 12 | 14 | 16 |
| Hip | $39^{1/4}$ | $40^{1/4}$ | $41^{3/4}$ | $43^{1/4}$ | 45 |
| Please enter your sizes according to the size chart above: | | | | | |
| Size on Top | | | | 10 | 308 |
| Size on Bottom | | | | 14 | 304 |

(A) →

(B) →

Customer Facing Web Site  310      316

| Enter size of blouse, bodice, shirt you usually wear | S | 317 |
|---|---|---|
| What brand of blouse, bodice or shirt do you usually wear? | Brand A | |
| Enter size of pants, skirt or shorts you usually wear | 12 | |
| What brand of pants, skirt or shorts do you usually wear? | Brand B | 318 |

319

(C) →

Customer Facing Web Site  312

Please enter your measurements

| Bust Size. | 37 | 321 |
|---|---|---|
| Waist Size | 28.5 | 322 |
| Hip Size | 43 | 323 |

FIG. 3 (Cont.)

Customer Facing Web Site 310

Enter size of blouse, bodice, shirt you usually wear | S |
What brand of blouse, bodice or shirt do you usually wear? | Brand A |
Enter size of pants, skirt or shorts you usually wear | 12 |
What brand of pants, skirt or shorts do you usually wear? | Brand B |

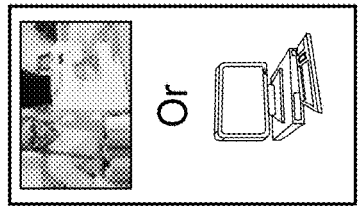
402

Brand A Size Chart — 404

| SIZE | BUST (Inches) | WAIST (Inches) |
|---|---|---|
| S 4-6 | 35-56 | 27-28 |
| M 8-10 | 37-38.5 | 29-30.5 |
| L 12-14 | 40-41.5 | 32-33.5 |
| 1X 16-18 | 43-45 | 34-36 |
| 2X 20-22 | 45.5-46.5 | 37-38 |

408 → 27-28
410 → 12, 38.5", 30.5", 41.5"

Brand B Size Chart — 406

| US Size-Numeric | 00 | 0 | 2 | 4 | 6 | 8 | 10 | 12 | 14 |
|---|---|---|---|---|---|---|---|---|---|
| Bust | 31" | 32" | 33" | 34" | 35' | 36" | 37" | 38.5" | 40" |
| Waist | 23" | 24" | 25" | 26" | 27" | 28" | 29" | 30.5" | 33" |
| Hip | 34" | 35' | 36" | 37" | 38' | 39" | 40" | 41.5" | 43" |

FIG. 4

Customer Facing Web Site 312

Please enter your measurements

| Bust Size. | 37 |
| Waist Size | 28.5 |
| Hip Size | 43 |

Or 502

| Dual Sizing Chart | | | | | |
|---|---|---|---|---|---|
| Size on Top | | | | | |
| (All measurements in inches) | | | | | |
| Bust | 8 | 10 | 12 | 14 | 16 |
| | 35 | 37 | 39 | 40 | 42 |
| Size on Bottom | | | | | |
| (All measurements in inches) | | | | | |
| Hip | 8 | 10 | 12 | 14 | 16 |
| | 39 1/4 | 40 1/4 | 41 1/4 | 43 1/4 | 45 |

512

702

Step 1: Collect Data from Various Sources or via Survey

Real Women Size Survey

Please be part of our real women's body survey by entering the following:

Bust measurement: _____
Waist measurement: _____
Hip measurement: _____
Age: _____
Height: _____
Weight: _____
Pants Size: _____
Shirt Size: _____

AND/OR

703

701

< measurements-2.csv (8.57 KB)

Detail  Compact  Column                    7 Of 7 columns

| # age | # height | # weight | # bmi | # chest |
|---|---|---|---|---|
| 22    81 | 64    77.8 | 119    263 | 18.1    39.1 | 79.3 |
| 27 | 71.25 | 168 | 23.3 | 93 |
| 47 | 72.25 | 158.25 | 21.3 | 90.2 |
| 48 | 72 | 173.25 | 23.6 | 99.1 |
| 49 | 73.5 | 198.5 | 25.9 | 106.5 |

FIG. 7

Step 2: Create Data Set of from all sources     704

| Size Database | | | | | | |
|---|---|---|---|---|---|---|
| | | | | | | |
| | Bust | Waist | Hips | Height | Weight | Age |
| Woman 1 | 37.75 | 30.5 | 38.5 | 5'7" | 160 | 42 |
| Woman 2 | 36 | 31 | 35 | 5'2" | 128 | 44 |
| Woman 3 | 38.5 | 34.5 | 39.5 | 6'0" | 142 | 51 |
| Woman 4 | 37.5 | 29.75 | 38.5 | 5'9" | 140 | 52 |
| Woman 5 | 37 | 30 | 41 | 5'9" | 153 | 39 |
| Woman 6 | 43.25 | 40 | 44.5 | 5'1" | 172 | 44 |
| Woman 7 | 45 | 40 | 48.5 | 5'3" | 165 | 52 |
| Woman 8 | 38 | 36 | 39.5 | 5'6" | 138 | 49 |
| Woman 9 | 38 | 32.5 | 35 | 5'6" | 121 | 55 |

705

Step 3: Run Regression     706

Step 4: Calculate Waist Size     708

Waist = x + a (Bust) + b (Hips) + c (Age) + d (Height) + e (V

802

Step 1: Take Order and/or Find New Data Source

Customer Order Collection

Customer Facing Web Site

Please enter your measurements

Bust Size. 37
Waist Size 28.5
Hip Size 43

801

OR

803 — 3D BODY SCAN and/or

| Table: Data List | | | | | | | | | |
|---|---|---|---|---|---|---|---|---|---|
| Gender M1F2 | Age | Height .cm | W Kg | BMI | Fatmass .Kg | FM | FFM .Kg | BMR .Kcal | BoneMass .Kg |
| 2 | 18 | 156.0 | 61.4 | 23.0 | 19.4 | 31.6 | 42.0 | 1298 | 2.1 |
| 2 | 18 | 156.0 | 61.4 | 23.0 | 19.3 | 31.4 | 42.1 | 1300 | 2.1 |
| 2 | 18 | 156.0 | 61.3 | 26.1 | 18.9 | 30.8 | 42.4 | 1275 | 2.2 |
| 2 | 18 | 156.0 | 62.8 | 21.7 | 20.7 | 33.0 | 42.1 | 1302 | 2.1 |
| 2 | 18 | 156.0 | 63.0 | 25.1 | 20.6 | 32.7 | 42.4 | 1277 | 2.2 |
| 2 | 18 | 156.0 | 65.4 | 23.0 | 23.2 | 35.5 | 42.2 | 1300 | 2.2 |
| 2 | 18 | 156.0 | 67.0 | 23.2 | 25.1 | 37.5 | 41.9 | 1320 | 2.1 |
| 2 | 18 | 156.0 | 67.2 | 27.6 | 26.0 | 38.7 | 41.2 | 1396 | 2.1 |

Step 2: Add data to size database            804

| Size Database | | | | | | |
|---|---|---|---|---|---|---|
| | Bust | Waist | Hips | Height | Weight | Age |
| Woman 1 | 37.75 | 30.5 | 38.5 | 5'7" | 160 | 42 |
| Woman 2 | 36 | 31 | 35 | 5'2" | 128 | 44 |
| Woman 3 | 38.5 | 34.5 | 39.5 | 6'0" | 142 | 51 |
| Woman 4 | 37.5 | 29.75 | 38.5 | 5'9" | 140 | 52 |
| Woman 5 | 37 | 30 | 41 | 5'9" | 153 | 39 |
| Woman 6 | 43.25 | 40 | 44.5 | 5'1" | 172 | 44 |
| Woman 7 | 45 | 40 | 48.5 | 5'3" | 165 | 52 |
| Woman 8 | 38 | 36 | 39.5 | 5'6" | 138 | 49 |
| Woman 9 | 38 | 32.5 | 35 | 5'6" | 121 | 55 |

806
Step 3: Re-run Regression

808
Step 4: Re-calculate Waist Size Interpolation

Waist = x + a (Bust) + b (Hips) + c (Age) + d (Height) + e (V

1010

1012

1014

1016

Or

1112

METHODS AND SYSTEMS FOR IMPROVED MANUFACTURING OF OFF-THE-RACK, TAILORED AND/OR CUSTOMIZED CLOTHING

CROSS-REFERENCE

The present specification relies on U.S. Patent Provisional Application No. 63/069,513, titled "Methods and Systems for the Improved Manufacturing of Customized Clothing", filed on Aug. 24, 2020, for priority.

FIELD

The present specification teaches methods and systems for the improved manufacturing of off-the-rack, tailored and/or customized clothing.

BACKGROUND

Current fashion fit/sizing processes do not work well for everyone. For example, there are many people whose busts are proportionately larger than their hips, and vice versa, those whose hips are proportionately larger than their busts. If they want to order a dress (or any single garment that is made to cover parts of the body above and below the waist) using a standard sizing chart, sometimes their bust measurements will indicate they should order one size, and their hip measurements will indicate that they should order another size. They then have to decide which of the two sizes to order the dress in, knowing that neither will fit them properly. For example, a woman who wants to buy a dress who has a larger bust than hips might be both a size 14 (in the bust) and a size 10 (in the hips) on a traditional size chart, and she would have to choose which size to order, with neither size fitting her properly.

Therefore, what is needed is a new system, process, and methodology that will allow a seller to sell, a manufacturer to create, and a customer to purchase, a dress that has a first size on top (such as size 14) and a second size on bottom (such as size 10), resulting in a dress that fits a person much better than one standard size. What is also needed is a process that involves at least one of a dual-sizing chart, dual-sizing pattern making process, dual-sized pattern, manufacturing interface, dual-sizing ordering process, dual-sizing ordering interface, dual-sizing conversion process, dual-sized garment (for example a dress, pant suit, one piece swimsuit, shapewear, romper, or jumper, or any other single garment that is made to cover parts of the body above and below the waist), and a dual-sizing manufacturing process.

The benefits of this system, process and methodology include: better fitting garments and therefore increased sales and fewer returns; easy-to-understand sizing guidelines that require no customer retraining; the advantages of scaled production with a closer approximation of the fit of a made-to-measure garment, and improved control of design details that may not otherwise be possible by simply adjusting measurements of a traditional single-size garment.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a system adapted to manufacture a garment, the system comprising: a server configured to execute a plurality of programmatic instructions, wherein, when executed, the plurality of programmatic instructions: generate data representative of one or more first sizes corresponding to a top portion of the garment and one or more second sizes corresponding to a bottom portion of the garment; electronically transmit said data to at least one computing device remote from the server; receive from the at least one computing device an order for the garment comprising at least a first measurement corresponding to an upper body of a person from the person's waist upwards and a second measurement corresponding to a lower body of the person from the person's waist downwards; determine at least one of the one or more first sizes closest to the first measurement; determine at least one of the one or more second sizes closest to the second measurement; generate a digital pattern representative of the garment by combining the at least one of the one or more first sizes and the at least one of the one or more second sizes at a waist, wherein said combining is achieved by electronically interpolating a waist size based on the at least one of the one or more first sizes and the at least one of the one or more second sizes; and cause the garment to be manufactured using the generated digital pattern.

Optionally, when displayed, the data comprises a dual-size chart. Optionally, when executed, the plurality of programmatic instructions receive the first measurement corresponding to the upper body of the person by receiving a selection of a first portion of the dual-size chart and receiving a modification of a first value in said first portion of the dual-size chart, wherein said modified first value is indicative of the first measurement. Optionally, when executed, the plurality of programmatic instructions receive the second measurement corresponding to the lower body of the person by receiving a selection of a second portion of the dual-size chart and receiving a modification of a second value in said second portion of the dual-size chart, wherein said modified second value is indicative of the second measurement.

The first measurement may be different from all of the one or more first sizes.

The second measurement may be different from all of the one or more second sizes.

Optionally, the system further comprises an original digital pattern formed by at least one of the one or more first sizes being combined with at least one of the one or more second sizes. Relative to the original digital pattern, the generated digital pattern may have a same shape but a different size combination. Relative to the original digital pattern, the generated digital pattern may have a same basic design but at least one of a top portion of the digital pattern or the bottom portion of the digital pattern has a different size.

Optionally, when executed, the plurality of programmatic instructions further causes data representative of the generated digital pattern to be electronically transmitted to the at least one computing device.

Optionally, when executed, the plurality of programmatic instructions further causes the data representative of the generated digital pattern to be displayed.

The present specification also discloses a method for manufacturing a garment, the method being implemented in a server configured to execute a plurality of programmatic instructions, the method comprising: generating data representative of one or more first sizes corresponding to a top portion of the garment and one or more second sizes corresponding to a bottom portion of the garment; electronically transmitting said data to at least one computing device remote from the server; receiving from the at least one computing device an order for the garment comprising at least a first measurement corresponding to an upper body of a person from the person's waist upwards and a second measurement corresponding to a lower body of the person from the person's waist downwards; determining at least one of the one or more first sizes closest to the first measurement; determining at least one of the one or more second sizes closest to the second measurement; generating a digital pattern representative of the garment by combining the at least one of the one or more first sizes and the at least one of the one or more second sizes at a waist, wherein said combining is achieved by electronically interpolating a waist size based on the at least one of the one or more first sizes and the at least one of the one or more second sizes; and causing the garment to be manufactured using the generated digital pattern.

Optionally, when displayed, the data comprises a dual-size chart. Optionally, the receiving of the first measurement corresponding to the upper body of the person comprises receiving a selection of a first portion of the dual-size chart and receiving a modification of a first value in said first portion of the dual-size chart, wherein said modified first value is indicative of the first measurement. Optionally, the receiving of the second measurement corresponding to the lower body of the person comprises receiving a selection of a second portion of the dual-size chart and receiving a modification of a second value in said second portion of the dual-size chart, wherein said modified second value is indicative of the second measurement.

The first measurement may be different from the one or more first sizes.

The second measurement may be different from the one or more second sizes.

Optionally, the method further comprises forming an original digital pattern by at least one of the one or more first sizes being combined with at least one of the one or more second sizes. Relative to the original digital pattern, the generated digital pattern may have a same shape but at least one of a top portion of the digital pattern or the bottom portion of the digital pattern has a different size.

Optionally, the method further comprises causing data representative of the generated digital pattern to be electronically transmitted to the at least one computing device.

Optionally, the method further comprises causing the data representative of the generated digital pattern to be displayed.

In some embodiments, the present specification discloses a system for sizing a garment, the system comprising: a combination of a first size corresponding to a top portion of the garment, and a second size corresponding to a bottom portion of the garment. Optionally, the garment is a single piece garment. Optionally, the system further comprises a display attached to the garment to display the combination of the first and the second sizes.

Optionally, the first size is different from the second size. Optionally, the first and the second sizes correspond to traditional sizes. Optionally, the top portion of the garment is associated with measurements of an upper body from the waist upwards of a human. Optionally, the bottom portion of the garment is associated with measurements of a lower body from waist downwards of a human.

In some embodiments, the present specification is directed towards a method of producing a dual-size garment, the method comprising: creating a dual-size chart comprising one or more combinations of a first size corresponding to a top portion of the garment and a second size corresponding to a bottom portion of the garment; receiving an order for the dual-size garment comprising at least a first measurement corresponding to an upper body from waist upwards, and a second measurement corresponding to a lower body from waist downwards, comprising: relating a combination from the dual-size chart that includes the first size closest to the first measurement, and the second size closest to the second measurement; generating a pattern for the dual-size garment by combining the first size and the second size at a waist portion of the garment; and manufacturing the dual-size garment using the generated pattern.

Optionally, the method further comprises adjusting the generated pattern to match the first size with the first measurement and the second size with the second measurement.

Optionally, the method further comprises performing the method using at least one of: at least one person and at least one machine.

Optionally, generating the pattern comprises: creating a base pattern by combining a top portion of a first single-size pattern of the first size and a bottom portion of a second single-size pattern of the second size, wherein the top portion and the bottom portion are combined at the waist portion; and interpolating the waist portion and adjusting the pattern to maintain an overall style of the garment.

Optionally, the method further comprises testing the generated pattern for fit.

Optionally, the method further comprises repeating the method for other combinations of first sizes corresponding to top portion of the garment and second sizes corresponding to bottom portion.

Optionally, the generating the pattern comprises using the generated pattern for manufacturing a second garment with a third size corresponding to a top portion of the second garment and a fourth size corresponding to a bottom portion of the second garment, wherein the difference between the third size and the fourth size is equal to the difference between the first size and the second size. Optionally, the second garment is of the same style as the dual-size garment.

Optionally, the generating the pattern comprises generating the pattern on at least one of paper, software program on a computer, and fabric.

Optionally, the receiving the order comprises receiving the order through an interactive graphical user interface. Optionally, the interactive graphical user interface receives sizes selected from a dual-size chart. Optionally, the interactive graphical user interface receives sizes used by one or more brands. Optionally, the interactive graphical user interface receives measurements of a customer.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (for example, boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2 illustrates an exemplary size chart that may be created by a seller of a single piece garment, in accordance with some embodiments of the present specification;

DETAILED DESCRIPTION

Figure 1:
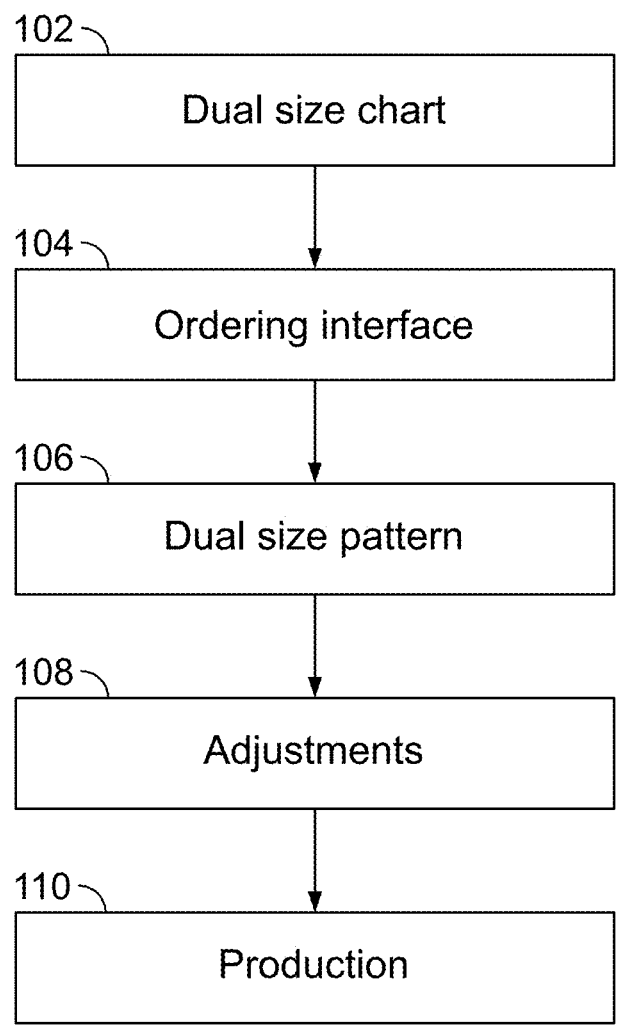
FIG. 1 illustrates a flow chart of an exemplary process that uses the dual-size approach, in accordance with some embodiments of the present specification.

The present specification is directed toward a method and system for customizing the size of a garment. In embodiments, single piece garments are custom-sized based on at least two different standard body measurements, such as for example a standard upper body measurement and a standard lower body measurement, where an upper body measurement is a measurement taken from a location on the body from the waist upwards and a lower body measurement is a measurement taken from a location on the body from the waist downwards. In some embodiments, single piece garments are custom-sized based on a single upper body measurement and a single lower body measurement. In other embodiments, single piece garments are custom-sized based on two, three, four, or more upper body measurements and two, three, four, or more lower body measurements. For purposes of the present specification, the methods and systems are described as dual-sized clothing. Accordingly, a single piece garment for a human individual is customized by combining at least one first size of an upper body measured from waist upwards, and at least one second size of a lower body measured from waist downwards. The first and second sizes correspond to different standard sizes of a single piece garment. The custom size pattern, generated by combining the first and the second sizes, is designed and created using a process of grading, wherein the custom garment is adjusted for the different sizes while proportionally maintaining the overall shape of the garment. A dress that has one size measurement for a first portion and a second size measurement for a second portion, is herein referred to as a dual-sized garment, dress or costume. Embodiments also provide an interface for a customer to select a custom size, from a dual-size chart that enables a choice of first and second sizes to allow for different body proportions. For purposes of the present specification, the customer may be an individual, a representative of an individual, or an entity.

In embodiments, adjustments can be made to refine the measurements corresponding to the generated custom sized pattern to account for differences between the customer's specified measurements and the data contained in the dual-size chart. In other words, a made-to-measure adjustment process may be implemented. Further, these adjustments may be made by hand or machine/software or both during garment fabrication.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

'Standard size' or 'Traditional size' refers to the numbers and/or text used to communicate a size of a garment. The sizes may correspond to womenswear, menswear, or childrenswear. For example, a brand or a seller may categorize different womenswear sizes for a woman with a height of 168 centimeters (cm) (66 inches), an inside leg of 79 cm (31 inches), with a bust measuring 82 cm (approximately 34 inches), and a waist measuring 65 cm (approximately 25 inches), to correspond to a garment sized 4, in the US. Standard size denominations may vary for different regions and countries. For the same example, a garment size that corresponds to the above-mentioned US size, may be referred to as size 8 in the UK. Additionally, standard sizes may include a range. For example, for womenswear with bust size in a range of 92-97 cm (36-39 inches) and a waist size in a range of 75-80.5 cm (28-31 inches), may correspond to a garment of medium size, or US size 10-14, or UK size 12-14. A standard size corresponds to a fixed combination of body measurements, including height, inside leg, hip, bust, and waist. Standard sizes are typically described in a size chart by brands, shops, sellers, and manufacturers. Size printed on a readymade garment corresponds to a size from the brand's/seller's standard size chart.

For purposes of the present specification, 'dual-size', which is also referred to herein interchangeably as 'dual-sized', 'dual-sizing', 'custom size', 'customized', 'semi-custom sized', 'semi-customized', or 'semi-custom', refers to a size of a single piece garment that combines two different standard sizes. In an example, a first standard US size of a dress is 8, and a second standard size of the same dress is 10. A dual-size corresponds to a dress of size which is tailored with an upper portion that corresponds to the first size (US 8), and a lower portion that corresponds to the second size (US 10). The ordering, manufacturing and/or related processes described herein or elsewhere may use the term "dual-sized garment", "dual-sized", "dual-sizing" or "custom-sized", but may also refer to "two sizes" or a size on top, size of bust, or similar phrase and a size on bottom, size of hips or similar phrase, and in no way is restricted by the dual-sized language contained herein. It should be understood by those of ordinary skill in the art that the terms mentioned above are interchangeable and may be used throughout the specification as such.

For purposes of the present specification a 'pattern' refers to a template, on paper, fabric, or in digital form, that is used as a key instruction guide for cutting separate pieces of a garment. The separate pieces are subsequently combined to create the single piece garment. Optionally, pattern pieces are traced to allow for size, seam allowance, and fit.

Conventionally, grading is used to refer to the act of scaling so that the relative relationships of measurements throughout a pattern are maintained according to a set of grading rules that have become common in the industry. 'Grading', in the fashion or garment industry, refers to the process of adjusting the size of a standard-sized base garment to a different size for a single style. In embodiments of the present specification, grading is used to refer to creating a dual-sized garment. In various embodiments of the specification, a first standard size garment for an upper body is adjusted according to a second standard size for a lower body to create a dual-sized pattern so that the pattern can be adjusted for the different sizes while proportionally maintaining the overall shape of the pattern. Grading accounts for the relative size difference between the upper part of the pattern and the lower part of the same pattern. In optional embodiments of the present specification, grading is achieved using a calculation to interpolate the adjusted waist or intersection measurement that joins the upper and lower portions of the custom garment.

'Single piece' garment refers to a garment designed for wearing by a human and which comprises a single piece of clothing. Examples of single piece garments include, and are not limited to: dresses, pant suits, rompers, shapewear, and one piece swimsuits.

In embodiments, the systems and methods of the present specification comprise a server configured to execute a plurality of programmatic instructions, wherein, when executed, the plurality of programmatic instructions communicate with a computing device. In embodiments, the computing device is at least one of a computer, cellular phone, PDA, smart phone, tablet computing device, custom kiosk, or other computing device capable of executing programmatic instructions. It should also be noted that the computing device is coupled to at least one display, which displays information as described below, by means of a graphical user interface (GUI). The GUI also presents various menus that allow users to configure settings according to their requirements. The computing device comprises at least one processor to control the operation of the entire system and its components. It should further be appreciated that the at least one processor is capable of processing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium. Thus, the processes and methods disclosed in the present specification are achieved by a plurality of plurality of programmatic instructions executing in one or more computing devices.

In embodiments, at least one computing device is connected to a remote server, wherein the server is configured to execute a plurality of programmatic instructions. In embodiments, any data generated is electronically transmitted to at least one computing device remote from the server. In embodiment, the server includes a volatile or non-volatile memory for storing programmatic instructions and or databases. In embodiments, the databases house measurement data and other data necessary for performing the processes and methods of the present specification.

FIG. 1 illustrates a flow chart of an exemplary process that uses the dual-size approach, in accordance with some embodiments of the present specification. It should be noted that the steps described in the flow chart may be performed in a different sequence from that illustrated in the figure. At step 102, a dual-size chart is created to display numerous combinations of standard sizes. Different sellers may offer different sets of combinations, which are displayed as dual-size options in a chart. The chart may include sizing information for an upper body size, such as for tops, blouses, and shirts (herein referred together as 'tops'); and a lower body size such as for pants, skirts, and shorts (herein referred together as 'bottoms'). FIG. 2 illustrates an exemplary size chart 200 that may be created by a seller of a single piece garment. Chart 200 includes a number of sizes 202 for a top portion, and a number of sizes 204 for a bottom portion, which may be subsequently combined to create a single piece garment. The figure also illustrates standard US sizes 206 for tops, which correspond to bust sizes 208 in measurement. Similarly, the figure illustrates standard US sizes 210 for bottoms, which correspond to hip sizes 212 in measurement. The chart illustrates measurements 208 and 212 in inches. In different embodiments, the standard sizes, unit of measurements, and body parts, that are used to create the chart, may differ to reflect the desired preferences of the seller.

Ordering Interface

At step 104, the size chart 200 is presented to a customer of the single piece garment, for selecting a custom size by combining different top and bottom sizes. In some embodiments, chart 200 is presented in a seller's physical location or remotely from the seller, physically in the form of a brochure, a display on a wall, or a catalogue or any other method of display. Alternatively, chart 200 is displayed on an ordering platform through an interactive graphical user interface, during an online shopping experience in an online seller and/or any other digital/electronic platform. The customer indicates a choice of a dual-size garment from a combination that is selected from chart 200. In some embodiments, the customer may choose one, two, three, four, or more sizes for the top and one, two, three, four, or more sizes for the bottom. In a physical retail space, the selected dual-size, if available is offered to the customer. In case the selected dual-size is unavailable, the customer may use a catalogue or an online ordering platform to place an order. When a garment is ordered online or through a catalogue, it is usually pulled from existing inventory stored at another location, and if the garment is no longer in inventory, the customer will receive a sold out or similar message. Alternatively, if the garment is not available in the inventory, it may be manufactured as per the customer's order, and as described in subsequent steps of the flow chart of FIG. 6.

Figure 3:
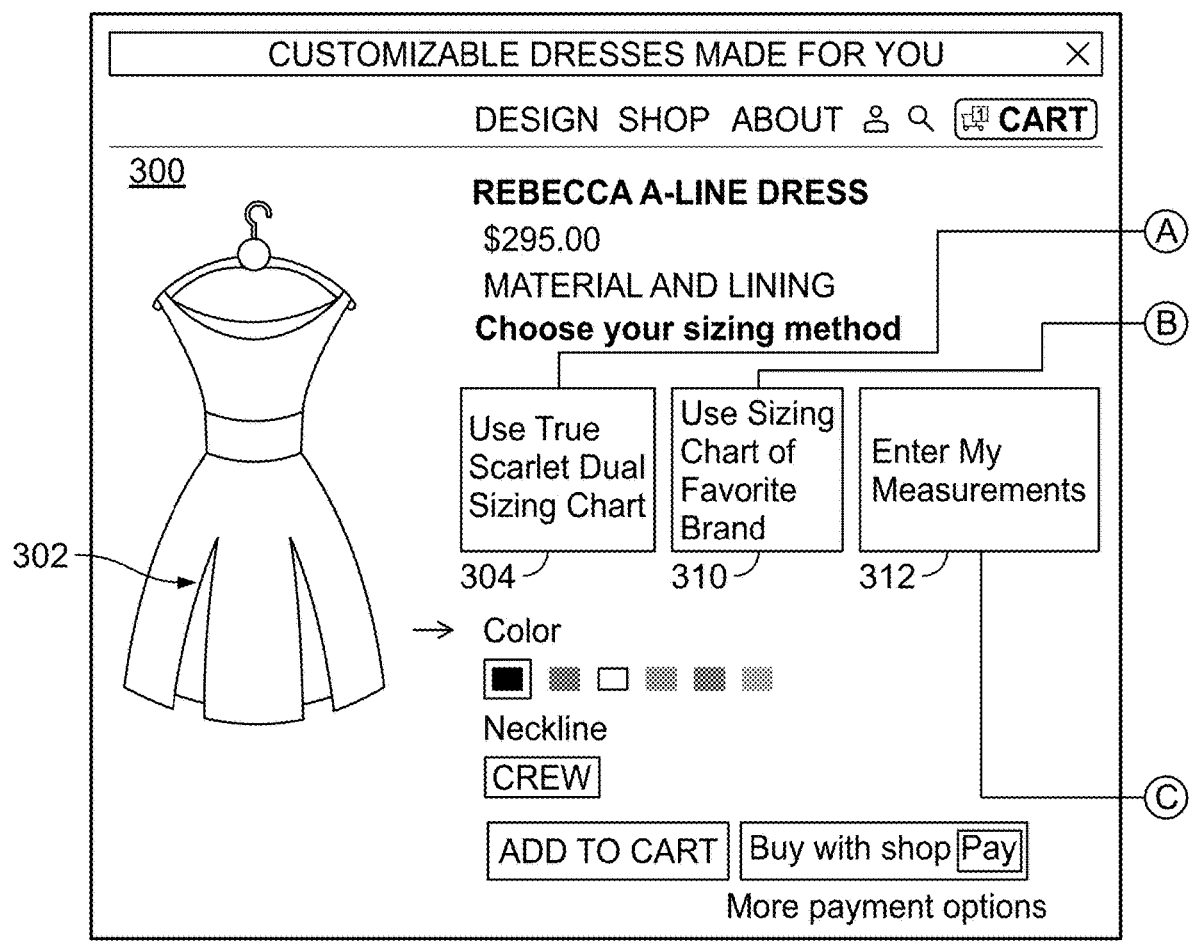
FIG. 3 illustrates an exemplary embodiment of an interface that is presented to a customer in accordance with the present specification.

FIG. 3 illustrates an exemplary embodiment of an interface 300 that is presented to a customer during an online shopping experience, in accordance with the present specification. Interface 300 displays a garment 302 along with its price and other details. The details may include, and are not limited to, information related to the garment such as fabric, wash instructions, and color options. A customer viewing interface 300 is additionally presented with one or more options to select a size for the garment, and subsequently place an order for the selected size. Selecting a first option 304, enables the customer to view a dual-sizing chart 306. The customer may either select a top size and a bottom size from the chart or may type-in the selected sizes in interactive fields 308 of interface presented for first option 304, that prompt for size information from the chart. In some embodiments, the customer may select one, two, three, four, or more sizes for the top and one, two, three, four, or more sizes for the bottom.

Selecting a second option, presents a second interface 310 to the customer. Interface 310 may prompt the customer to enter sizes using sizing chart of a brand that is preferred by the customer. In an example, a first prompt 316 may ask the customer to enter the size of a top (blouse, bodice, shirt, or bikini top, as applicable) that is usually worn by the customer. A second prompt may ask to enter the brand 317 of which the mentioned size of the top is worn. Similarly, a third prompt 318 may ask the size of a bottom (skirt, pants, shorts, or bikini bottom, as applicable) that is usually worn by the customer, and a fourth prompt 319 may ask to enter the brand of which the mentioned size of the bottom is worn.

Figure 4:
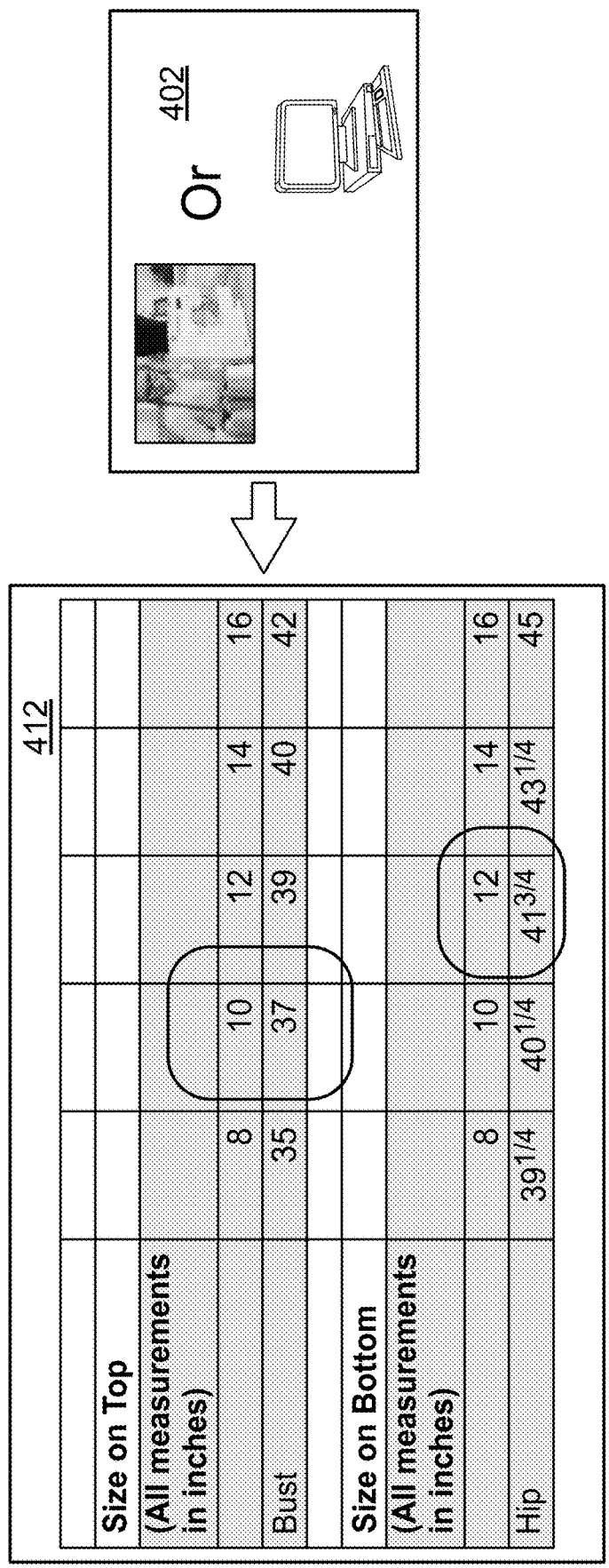
FIG. 4 illustrates an exemplary process of converting the traditional sizing data entered by a customer using interface, in accordance with some embodiments of the present specification.

FIG. 4 illustrates an exemplary process of converting the traditional sizing data entered by a customer using interface 310, in accordance with some embodiments of the present specification. Data collected from interface 310 is communicated over a wired or a wireless interface to a remotely located person, server, or a computer or computing device 402. Person or computer 402 is instructed to compare the traditional size data fed by the customer, to a dual-sizing chart 412 of the seller. While one size has been entered for the top and one size for the bottom, in some embodiments, the customer may enter two, three, four, or more sizes for both the top and bottom. In the illustrated example of FIG. 4, customer has entered a top size S of a brand A, and a bottom size 12 of a brand B. Person or computer 402 obtains traditional size charts 404 and 406 of brands A and B respectively. The various body measurements 408 and 410 that correspond to the customer-selected top and bottom sizes are picked out from each chart 404 and 406. In an example, the size S for brand A may correspond to a bust size of 35-36 inches, and a waist size of 37-28 inches. Similarly, the size 12 for brand B may correspond to a bust size of 38.5 inches, a waist size of 30.5 inches, and a hip size of 41.5 inches. The identified body measurements may be further processed by person or computer 402 to locate the corresponding matching sizes in the seller's dual-size chart 412. In the stated example, top size 10 associated with a bust size of 37 inches, and a bottom size 12 associated with a hip size of 41.74 inches from dual-size chart 412, are identified to correspond to the customer-selected traditional brand sizes. The comparison provides closest equivalent sizes that correspond to the traditional brand sizes provided by the customer. The closest equivalent may be an exact match or closest of the larger or smaller of the two standard sizes. In other words, the sizes may not exactly match, or may be different from, the body measurements.

Referring again to FIG. 3, selecting a third option presents a third interface 312 that prompts the customer to provide their personal measurements. In an example, the customer is asked to enter measurements for bust size 321, waist size 322, and hip size 323. The unit of the measurements may be selected by the customer. Examples of units of measurement may include cm and inches. In another embodiment, a body scan is performed by a scanning interface in communication with the third interface 312, which scans the customer's body to generate body measurements.

Figure 5:
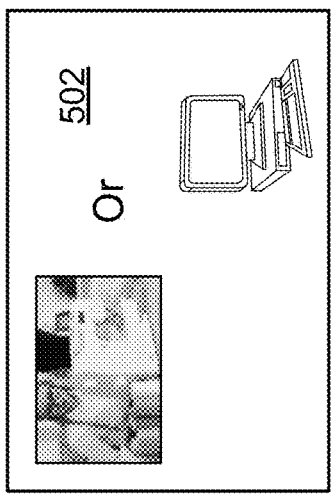
FIG. 5 illustrates an exemplary process of converting the traditional sizing data entered by a customer using the interface, in accordance with some embodiments of the present specification.
Figure 5:
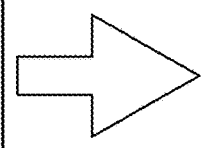

FIG. 5 illustrates an exemplary process of converting the traditional sizing data entered by a customer using interface 312, in accordance with some embodiments of the present specification. In the illustrated example, the customer enters a bust size of 37 inches, a waist size of 28.5 inches, and hip size of 43 inches. While one size has been entered for the top and one size for the bottom, in some embodiments, the customer may enter two, three, four, or more sizes for both the top and bottom. Data collected from interface 312 is communicated over a wired or a wireless interface to a remotely located person or a computer 502. Person or computer 502 is instructed to compare the traditional size data fed by the customer, to a dual-sizing chart 512 of the seller. In the illustrated example of FIG. 5, the customer-provided data is compared to a top size of 10 associated with bust measurement of 37 inches, and a bottom size of 14 associated with hip measurement of 43.25 inches. The comparison provides closest equivalent sizes that correspond to the traditional brand sizes provided by the customer. The closest equivalent may be an exact match or closest of the larger or smaller of the two standard sizes. In some embodiments, the customer may be provided with an option to select the closest equivalent measurement from the dual size chart.

In some embodiments, the customer may verbally provide the body measurement data in relation to a garment that is worn by the customer or that is measured using a body measurement method.

The ordering interface of FIGS. 3-5 are provided by way of examples. In embodiments, the ordering interface includes any form of interface where a customer communicates their measurements or size requirements. Examples of interfaces include, and are not limited to, in-person, email, text, mail, telephone, chat, website, portal, app, interactive television, or a software program, including but not limited to 3D body scan technologies. In embodiments, the ordering interface accepts one or more orders for a dual-sized garment. Further, in embodiments, the ordering interface is configured to reroute the order, if necessary, to a person or entity to manufacture the ordered garment, through a manufacturing interface.

Figure 6:
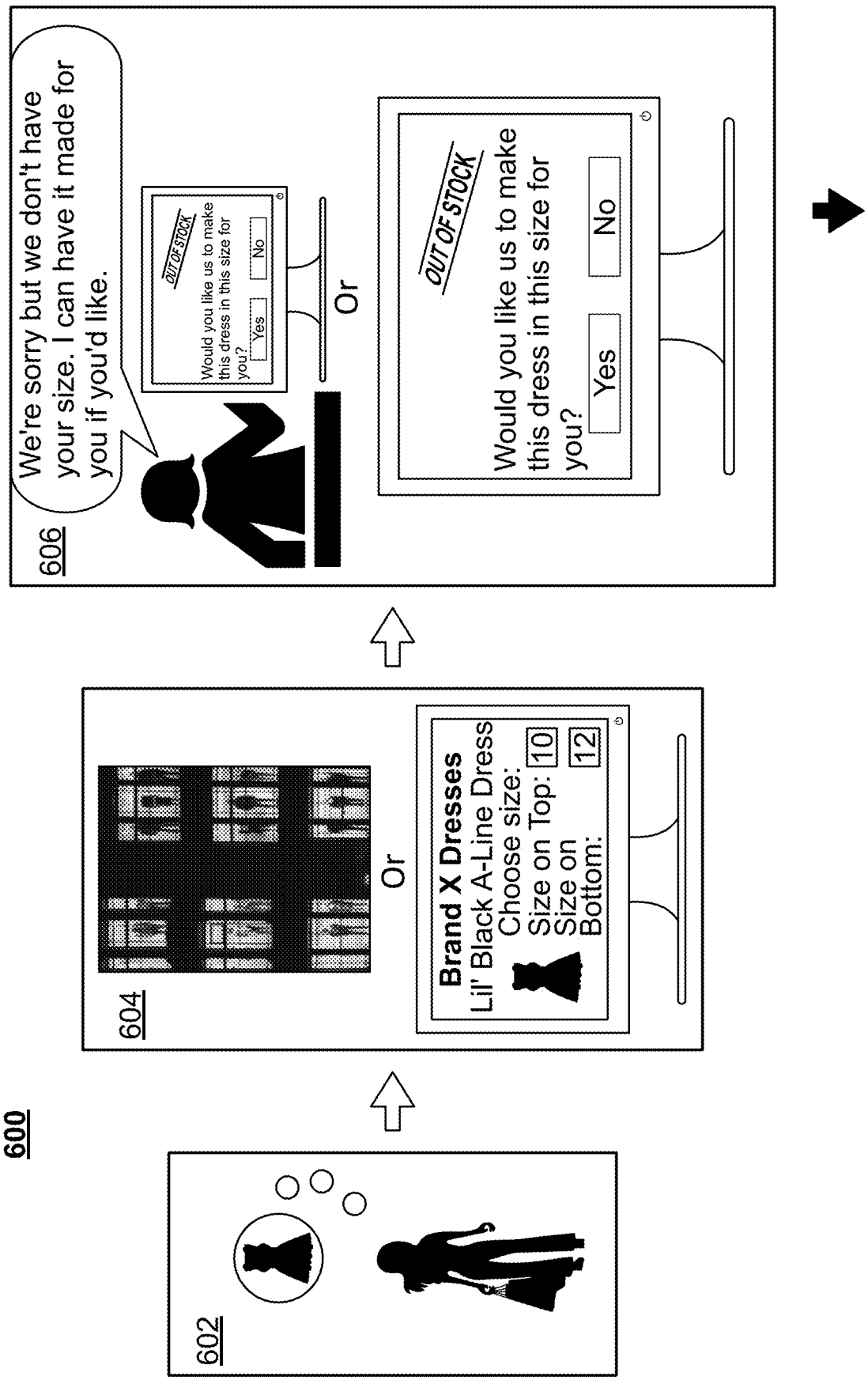
FIG. 6 illustrates an exemplary purchase process for a garment that involves a manufacturing interface, in accordance with some embodiments of the present specification.
Figure 6:
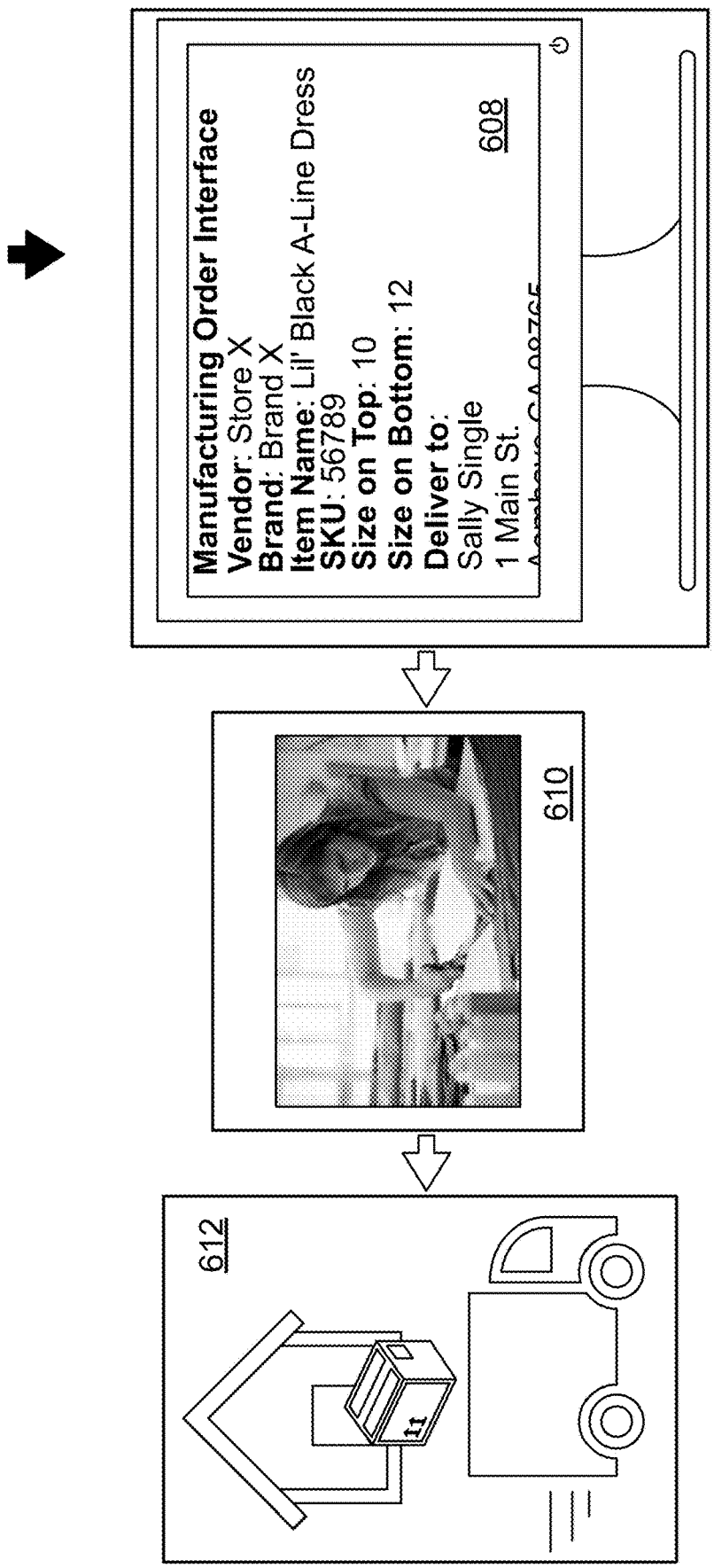

FIG. 6 illustrates an exemplary purchase process 600 for a garment that involves a manufacturing interface 608. At 602, a potential customer selects a specific type of clothing or garment that is to be purchased. At 604, the customer visits a seller either physically by walking into a retail space, or online through a website, app, catalogue, or online portal. At this stage, the customer may specify the dual-size measurements required for the desired garment. The dual-size measurements may include a first size and a second size, which may correspond to an upper body measurement and a lower body measurement. At 606, the seller (physical or online) may inform the customer that the specified garment of interest is unavailable for the required size. The seller may offer the customer the option to order and/or have tailored the garment of interest in the specified size. If the customer accepts, then a manufacturing interface 608 is used by the seller to specify the type of garment and the required dual-size measurements or sizes to place an order with a manufacturer. At 610, the garment is fabricated based on the details provided by the seller through the manufacturing interface 608. In embodiments, the garment may be either one or both of machine-manufactured/sewn or hand-tailored/sewn. Subsequently, at 612, the ordered and/or tailored garment is shipped to the seller or directly to the customer.

Dual-Size Pattern

Referring again to FIG. 1, at step 106, the selected garment, if not in stock, is manufactured by creating a dual-sized pattern for the selected garment. Dual-size pattern making process of step 106 is also used to manufacture a garment for subsequently selling or making it available for sale. For each dual-size garment, an applicable dual-sized pattern is selected based on style and size combination, fabric cut (by hand or by using a machine or both) and then used by the manufacturer to sew (by hand or by machine or both).

In some embodiments, the dual-size pattern is created by constructing single-sized pattern(s) by taking existing single-sized pattern(s) for the single piece dual-sized garment. An example of this process is also subsequently described in relation to FIG. 10. In another example, to create a garment with an upper body size 10 and a lower body size 12, two patterns of the garment of sizes 10 and 12 each are used. The two patterns may be the same, where both are of either size 10 or size 12 or may be different where one is of size 10 and other of size 12. The patterns of the two single-sized garments are identified and combined. The combination process may be performed digitally or manually on paper. In some embodiments, the single-sized garments are deconstructed/divided at the waist and reconstructed with a new pattern by taking the upper portion of garment of size 10 and lower portion of garment of size 12. The two portions taken separately from the two single-sized garments are joined at the waist. In embodiments, joining the two portions taken separately from the two single-sized garments includes creating adjustments to the pattern that gradually adjust for the difference in pattern sizes at the top and bottom, so that the two pieces can join at the waist at a circumference determined by the dual-sized combination using the process described below. In embodiments of the present specification, the resulting pattern is termed a "Dual-sized Pattern". Additionally, in embodiments, the top portion of the new pattern maintains all of its original details such as: the neck girth, bust, under bust, shoulder, arm length, bicep girth, bust height, shoulder to waist front and back, and back. Similarly, the bottom portion maintains the entirety of its original details such as: hip, hip height, thigh girth, calf girth, leg length, and waist to floor.

In alternate embodiments, a pattern for the dual-sized garment is created after determining the overall measurements of the garment for making the pattern. In an example, for a desired size 8 on top and 6 on bottom, the various measurements to be used for making the pattern are determined, and a new pattern is created with the determined measurements and applicable grading. In this method, a dual-sized pattern can use any method to determine the measurement of the intersection between the top and the bottom of the patterns at the waist, such as those discussed in a subsequent section below, or it can use a waist size determined independent of these methodologies.

In embodiments for creating a pattern for the dual-sized garment, the process of determining the waist portion, where the top (upper body) portion of first size and bottom (lower body) portion of a second size are combined, is important. This is also described in relation to FIG. 10. The waist size can be of any measurement desired. For example, the waist of the dual-sized garment can be the waist measurement of the larger of the two sizes, the waist measurement of the smaller of the two sizes, a measurement larger than the larger of the two sizes, a measurement smaller than the smaller of the two sizes, or the average of the two sizes.

Figure 7:
FIG. 7 illustrates an exemplary process of waist interpolation, in accordance with some embodiments of the present specification.
Figure 7:
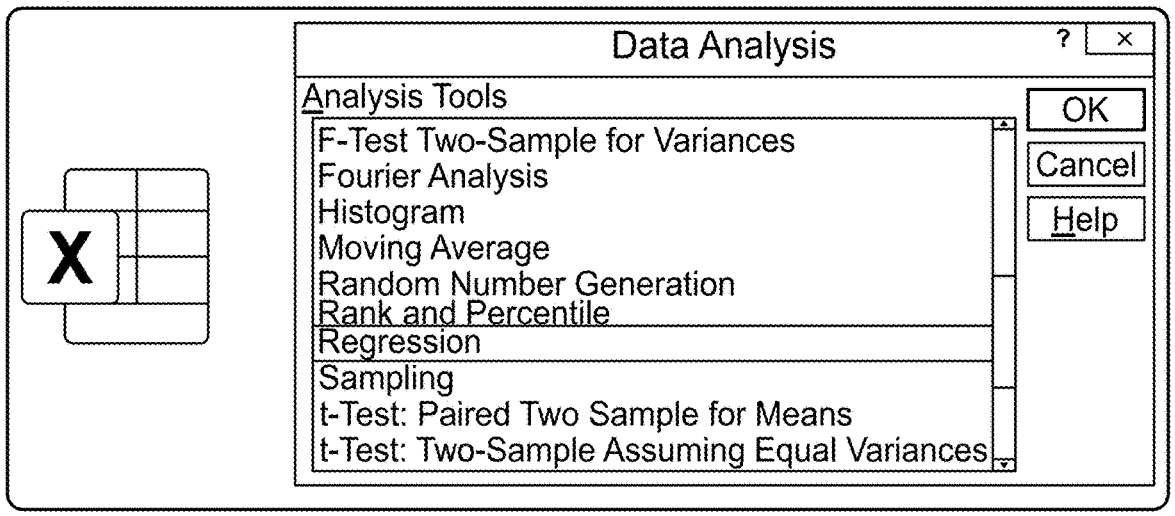

FIG. 7 illustrates an exemplary process of waist interpolation, in accordance with some embodiments of the present specification. Referring to the figure, at step 702, measurement data is collected from a target customer demographic, or is retrieved from an existing database. In some embodiments, a demographic database 701 comprising body related weights and measurements data is used. In some other embodiments, a survey 703 is conducted to create a database of body weights and measurements for a demographic sample of customers. At step 704, one or more data sources are combined to create a data set 705 of information that is useful for waist interpolation. The information may include specific measurements such as bust measurement, waist measurement, hip measurement, weight, and age of a number of customers from that demography. At step 706, the data is used in a regression equation, with the waist measurement as the dependent variable, and other body measurements such as those associated with bust, hip, height and/or weight measurements as the independent variables. Other variables, such as and not limited to customer age, can also be added to this equation. Care is taken to avoid auto-correlation of independent variables to arrive at the best predictive model while not forcing the model to fit, thereby undermining the validity and resulting accuracy of the predicted waist measurement. At step 708, the regression equation is used to determine an optimal waist measurement. In some embodiments, waist interpolation is performed by the systems of the present specification by creating pattern lines that gradually adjust the pattern to reflect the size on the top and a gradual progression through the desired waist size to the desired size on the bottom.

Figure 8:
FIG. 8 illustrates an exemplary machine learning process that may be used to constantly improve waist interpolation, in accordance with some embodiments of the present specification.
Figure 8:
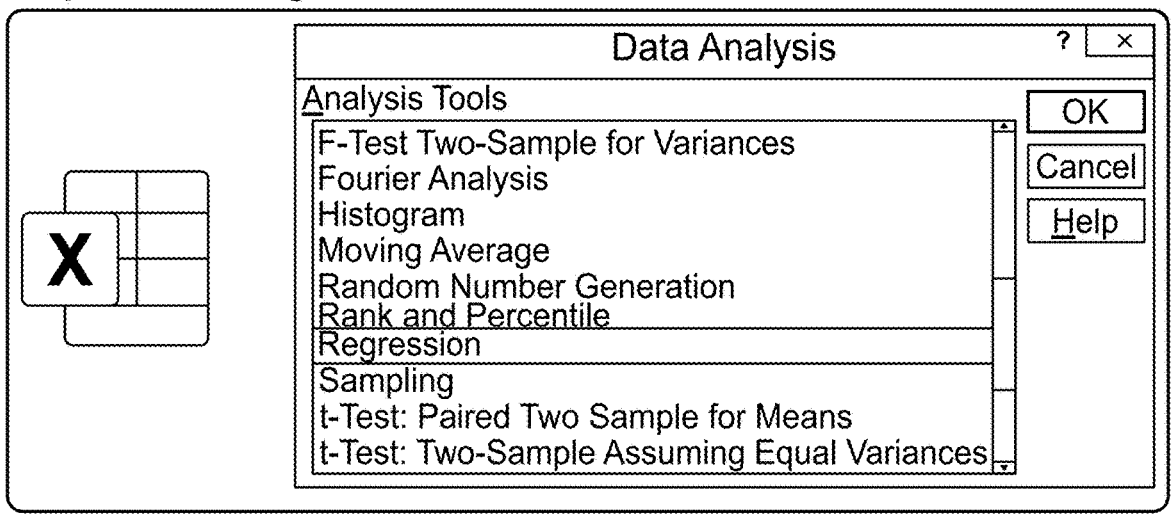

FIG. 8 illustrates an exemplary machine learning process that may be used to add to data of step 704 and use in the equation of FIG. 7 to constantly improve waist interpolation, in accordance with some embodiments of the present specification. At step 802, new data is sourced each time a new customer order is received with top and bottom measurement for a dual-sized garment. The measurements may include the customer's bust, waist and hip measurements that may have been measured manually 801 or using a body scan 803. Alternatively, new data is sourced from an additional database 805. At step 804, the new data is added to the existing database such as database created at step 704 of FIG. 7. At step 806, the data from the now modified database is used in the regression equation. As before, the waist measurement may be the dependent variable, and other body measurements such as those associated with bust, hip, height and/or weight measurements may be the independent variables. Other variables, such as and not limited to customer age, can also be added to this equation. Care is taken to avoid auto-correlation of independent variables to arrive at the best predictive model while not forcing the model to fit, thereby undermining the validity and resulting accuracy of the predicted waist measurement. At step 808, the regression equation is used to re-calculate an optimal waist measurement. The optimal waist measurements calculated using models of the present specification may be used for manufacturing future dual-sized garments that do not specify a waist size. The learning process of FIG. 8 can be performed manually or can be achieved through a software program/automation.

Figure 9:
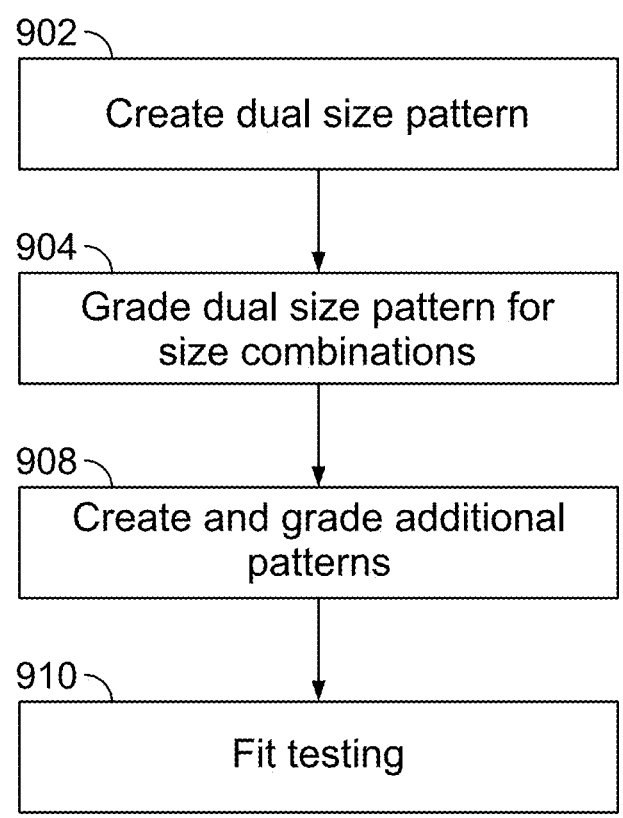
FIG. 9 is an exemplary process of pattern making, in accordance with some embodiments of the present specification.

The process of pattern making of step 106 may be further described in context of a flow chart. FIG. 9 is an exemplary process of pattern making, in accordance with some embodiments of the present specification. At step 902, the pattern for a dual-sized garment is created, such as by using the methods described above and in relation to FIGS. 7, 8 and 10. At step 904, the dual-size pattern created at step 902 is graded for desired size combinations. In some embodiments, a first standard size for an upper body is combined with a second standard size for a lower body to create a custom dual-sized pattern. The custom pattern can then be adjusted or graded for different sizes while proportionally maintaining the overall shape of the pattern. The grading is performed with a pattern prior to manufacturing. The grading is accomplished manually by using a base paper or a base machine-created pattern in one base size and interpolating the same pattern in different sizes or, stated differently, grading the same pattern in different dual-size combinations. In preferred embodiments, grading is performed before cutting and sewing and before manufacturing.

In embodiments, 'size differential' is a term that is used to describe a size difference between an upper body (top) size and a lower body (bottom) size, for a dual-sized garment. The size differential notes which of the two sizes (top and bottom) is bigger. In an example, a garment can have a size differential of one with the top size being larger, or a size differential of one with the bottom size being bigger. The size differential of a dual-sized garment with top size 10 and bottom size 12 is described as size differential of one with the size on top smaller than the size on bottom.

In embodiments, 'size combination' is a term that is used to describe the combination of sizes on top and bottom offered in one dual-sized garment. For the above example, the size combination may be described as 10/12, which indicates an upper body size equivalent to a garment of size 10, and a lower body size equivalent to a garment of size 12. Note that in the described embodiment, the first size referred to in the size combination is the size on top (upper body), and the second size is the size on bottom (lower body), and could be referenced in any other manner. Optionally, the tops and bottoms of the pattern can be combined for each size combination. Different size combinations can be created after a dual-sized pattern is determined for a size differential, using the method of grading. Stated differently, grading is used to expand a dual-sized pattern for a specific size differential resulting in a pattern, for creating multiple size combinations that follow the same size differential. The dual-size pattern of size differential of one with size on top larger, the pattern created at step 902 is graded at step 908 to accommodate multiple size combinations within the specified size differential. Continuing with the above example, the garment created for a dual-size combination 10/12 is graded to allow for sizes: 8/10, 12/14, 14/16, 16/18, 6/8, 4/6, 2/4, 0/2, and so on. Therefore, at step 908, steps 902 and 904 are repeated to accommodate different size differentials for different size combinations.

In alternate embodiments, each top and bottom size is joined to create a new pattern instead of grading one pattern for different size combinations. In an example, a pattern of top size 18 is combined with a pattern of bottom size 16. In another example, a pattern of top size 16 is combined with a pattern of bottom size 14. Additional patterns using the dual-sized patterns involving the steps of FIGS. 9 and 10 can be created for individuals who are tall, petite, or a combination of different body proportions. Instead of grading a single pattern for different sizes, one pattern can be made for each dual-size.

Therefore, at step 908, steps 902 and 904 are repeated for every style in order to create patterns that accommodate multiple size differentials. The different combinations may include patterns for garments where: size on top is x sizes bigger than size on bottom, where x is any number; and size on bottom is y sizes bigger than size on top, where y is any number.

At 910, optionally at any point during the process of FIG. 9, any dual-size garment is tested for fit. In embodiments, the garment is made and subsequently tried on by a person or on a dress form, or electronically on a digital model. The dual-size pattern is adjusted at this stage to perfect the fit of the garment. The process of adjusting the fit optionally includes adjusting the design of the garment to accommodate desired design features to perfect the dual-size pattern embodiment of the single-sized pattern(s). This process is repeated until the garment has an optimal fit.

Figure 10:
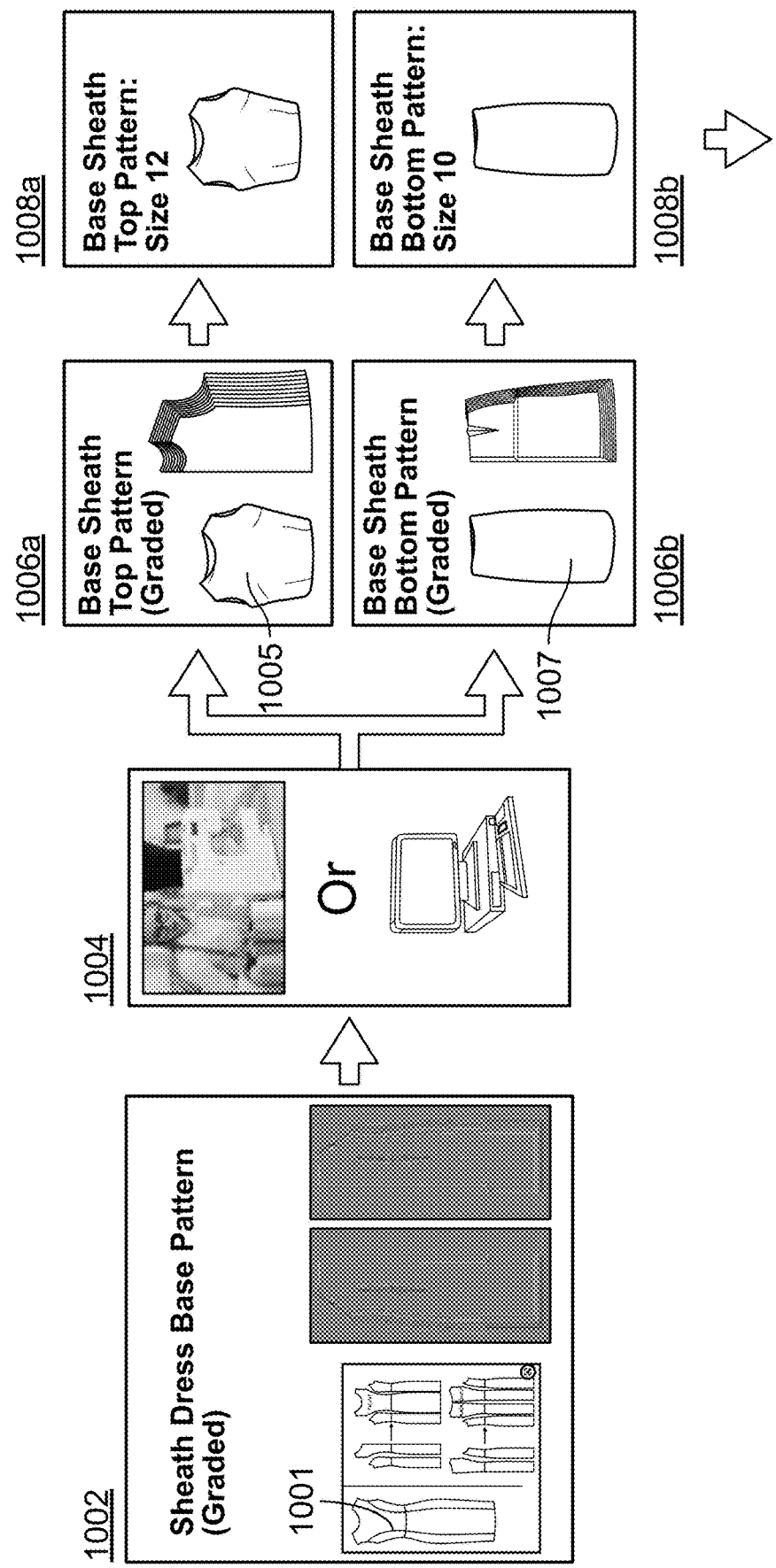
FIG. 10 illustrates an exemplary process of dual-size pattern making including grading, in accordance with some embodiments of the present specification.
Figure 10:
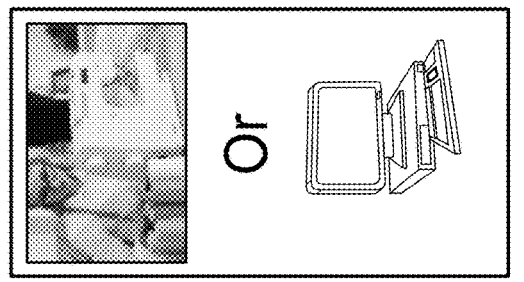
Figure 10:
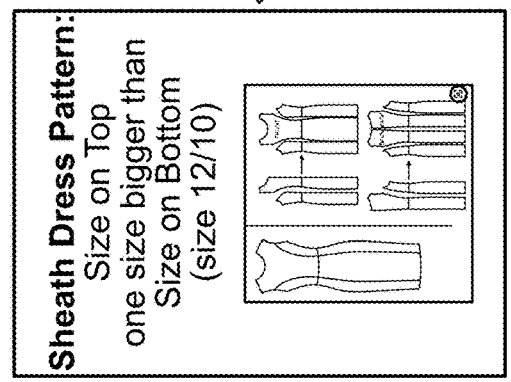
Figure 10:
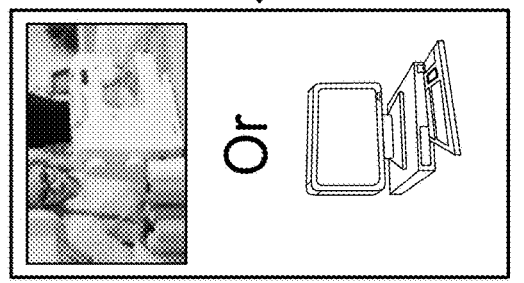
Figure 10:
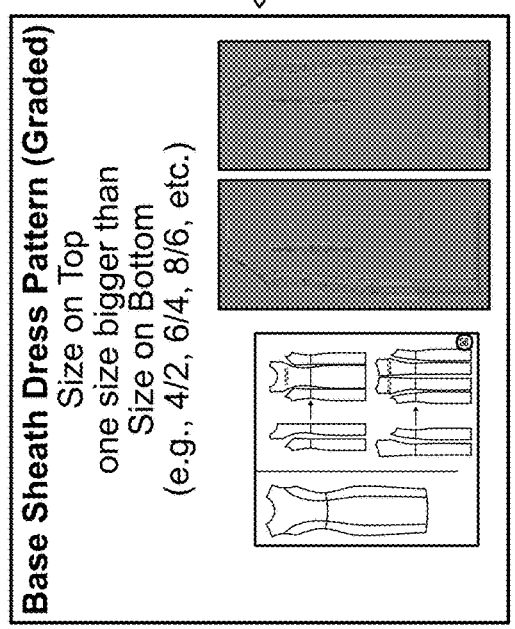

FIG. 10 illustrates an exemplary process of dual-size pattern making including grading, in accordance with some embodiments of the present specification. At step 1002, a single-size base pattern 1001 is procured, which may have already been graded individually for its corresponding single-sizes. At step 1004, a person or a machine splits or divides the single-size base pattern into two pieces—a top piece and a bottom piece. The split is preferably achieved at the waist of the original single-size single-piece garment. At step 1006*a*, the base pattern for the top piece is graded to create top pattern 1005 for a first size (size 12 in the illustrated example) at step 1008*a*. Similarly, at step 1006*b*, the base pattern for the bottom piece is graded to create a bottom pattern 1007 for a second size (size 10 in the illustrated example). At step 1010, a person or a machine identifies the top base pattern as a size 12 and joins it at the waist with the bottom base pattern, which was identified as size 10, into a dual-sized pattern that is size 12/10. The joining or combination is performed by determining what the measurement should be at the waist, and then adjusting the top and bottom patterns so that they will join at that new waist size. The interpolated size of the waist may be decided upon by the seller and may be based upon a combination of the size on top and bottom, or optionally on the data of the target market demographic, and/or using regression or other interpolation methods to determine the resulting waist measurement, as described in relation to FIGS. 7 and 8. At step 1012, the result is a dual-sized pattern for size 12/10. In embodiments, the top portion of the new patterns maintain all of its original details such as: the neck girth, bust, under bust, shoulder, arm length, bicep girth, bust height, and shoulder to waist front and back. Similarly, the bottom portions maintain all of its original details such as: hip, hip height, thigh girth, calf girth, leg length, and waist to floor. At step 1014, either a person or a machine is used to grade the resulting dual-size pattern for other size combinations with the same size differential. Examples of other size combinations may include 10/8, 8/6, 6/4, among other size combinations. Therefore, at step 1016, a new dual-size pattern is made available for each size combination with same size differential, by taking any top from the new base pattern and bottom from the new base pattern that represents the required size differential and combining them into a new pattern with a waist circumference that is an interpolated size between the top and bottom. Alternatively, a different pattern is generated for each size combination.

Adjustments

Figure 11:
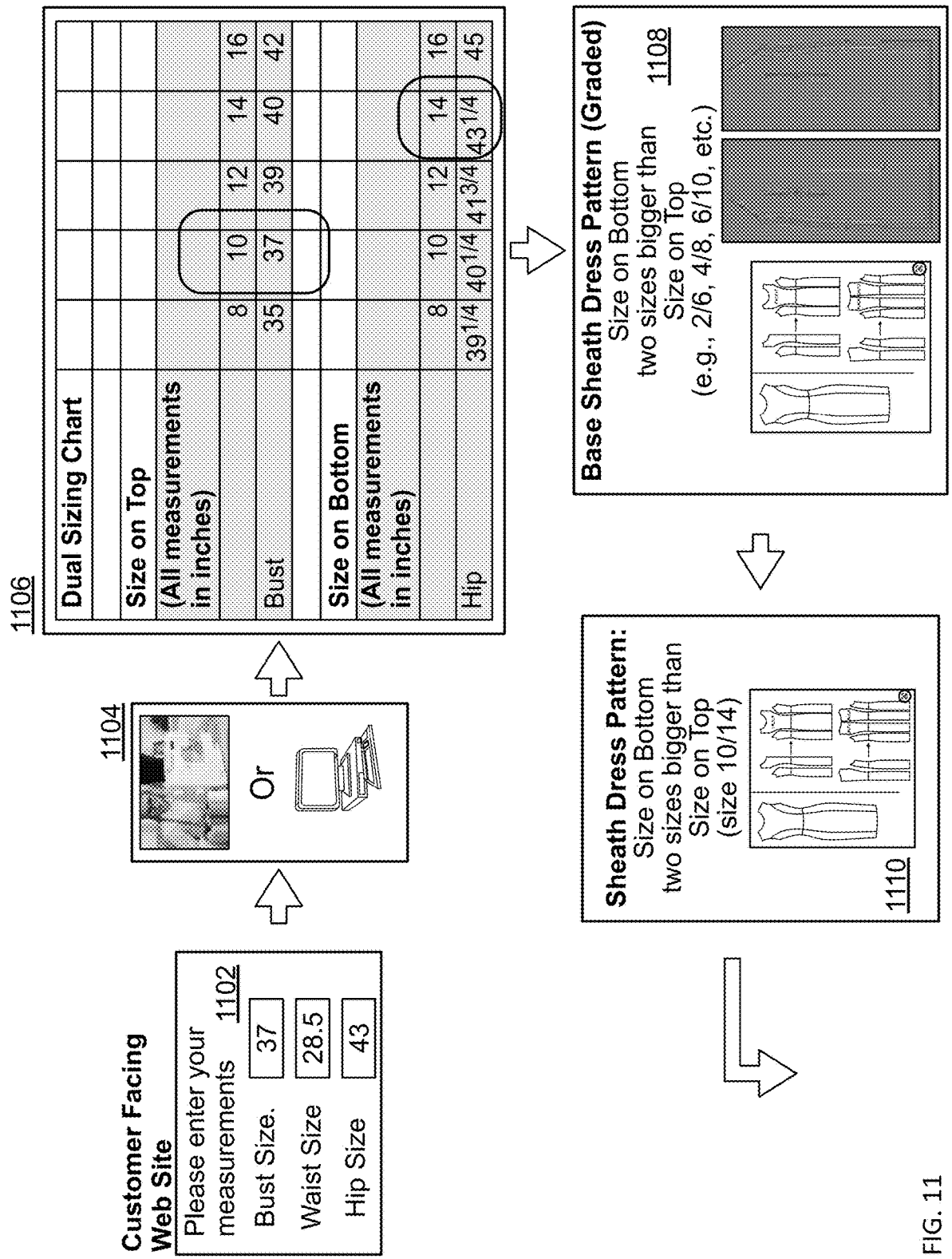
FIG. 11 illustrates an exemplary made-to-measure adjustment process, in accordance with some embodiments of the present specification.
Figure 11:
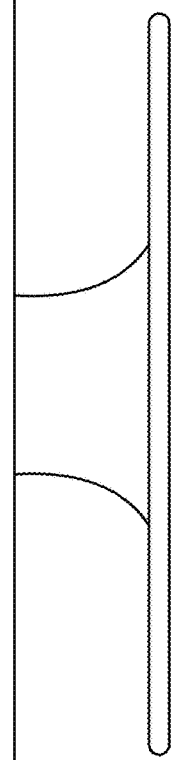
Figure 11:

Referring again to FIG. 1, at step 108, made-to-measure adjustments are optionally performed. FIG. 11 illustrates an exemplary made-to-measure adjustment process, in accordance with some embodiments of the present specification. The illustration refers to an exemplary scenario 1102 where a customer provides traditional measurements. Here, the measurements include a bust size of 37 inches, a waist size of 28.5 inches, and hip size of 43 inches. The measurements of 1102 may be input through a computer interface. At 1104, the measurements are communicated by the computer, or personally, to a person or program that converts the measurements to equivalent measurements in a dual-size chart 1106. The process of obtaining and converting the measurements is like that described in relation to FIG. 5. In the given example, the customer's measurements correspond to a top measurement of 10 associated with a bust size of 37 inches, and a bottom measurement of 14 associated with hip size of 43.25 inches. Therefore, the size combination of the measurements input by the customer corresponds to 10/14. At 1108, a dual-size sheath dress pattern that is created and graded for a size differential of two with the bottom larger than the top, is used to create the sheath dress pattern for the dual-sized garment selected by the customer for size 10/14, at 1110. Finally, at 1112, adjustments are made to refine the measurements corresponding to the dual-sized pattern of 1110, to account for differences between the customer's specified measurements and the data contained in the dual-sizing chart 1108. In the given example, the bust size specified by the customer at 1102 and the bust size identified from the dual-size chart 1108 are the same, therefore no adjustment is needed. However, the hip size of the garment created at 1110 is adjusted to decrease by 0.25 inches to match the customer-specified hip measurement of 43 inches. Since the top and bottom of the dual-sized pattern do not match the customer's problem measurements exactly, additional instructions can be given to the manufacturer to alter the dual-sized pattern to fit the measurements exactly. The adjustments are made by hand, automatically by a computerized machine, or a combination of both when the garment is manufactured. The made-to-measure adjustments can be used to change any measurements in the garment, including the waist measurement. In case the waist measurement is altered, the inclusion of a special waist measurement is anticipated and planned for in the dual-sizing methodology.

In embodiments, a seller may choose to market this embodiment as a three-sized system or in any other way.

Production

Figure 12:
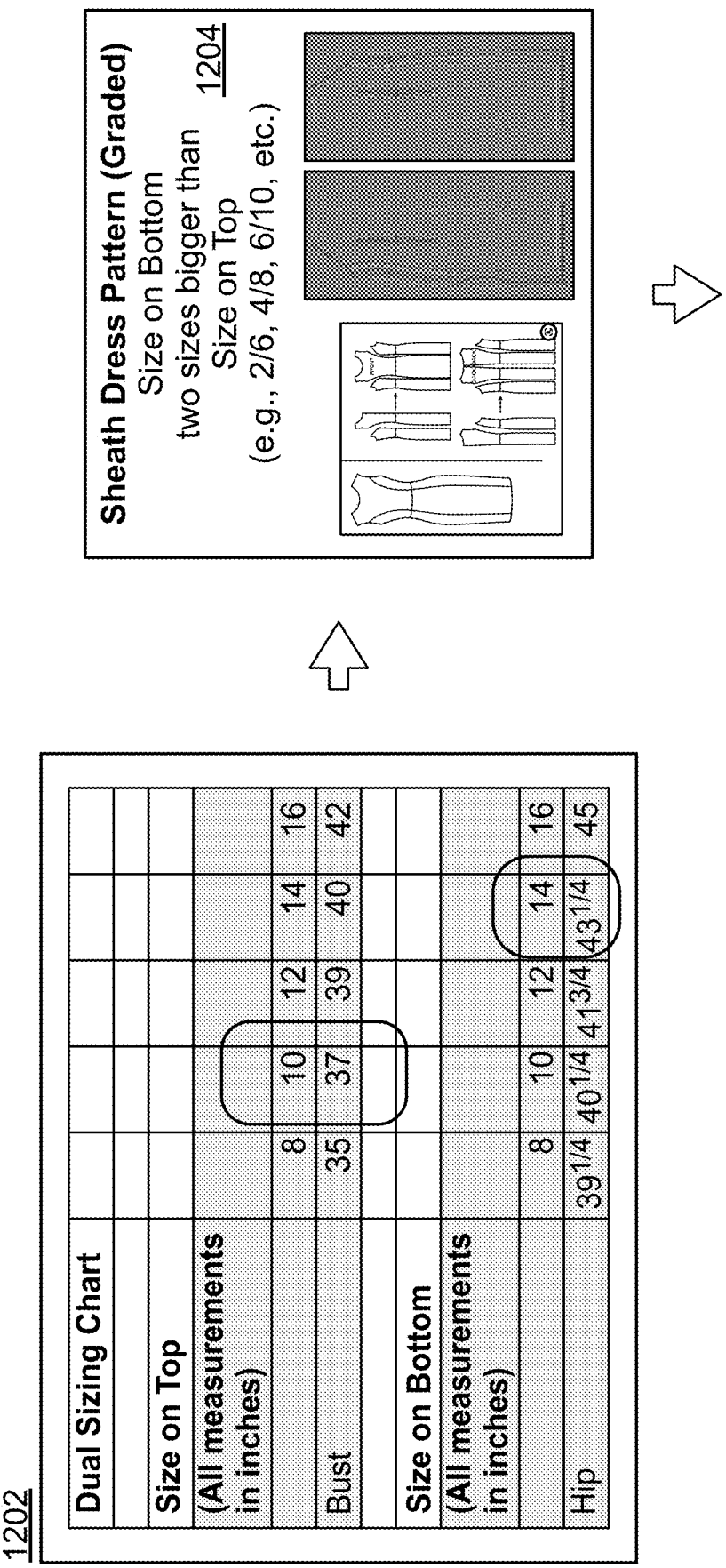
FIG. 12 illustrates another exemplary manufacturing process, in accordance with some embodiments of the present specification.
Figure 12:
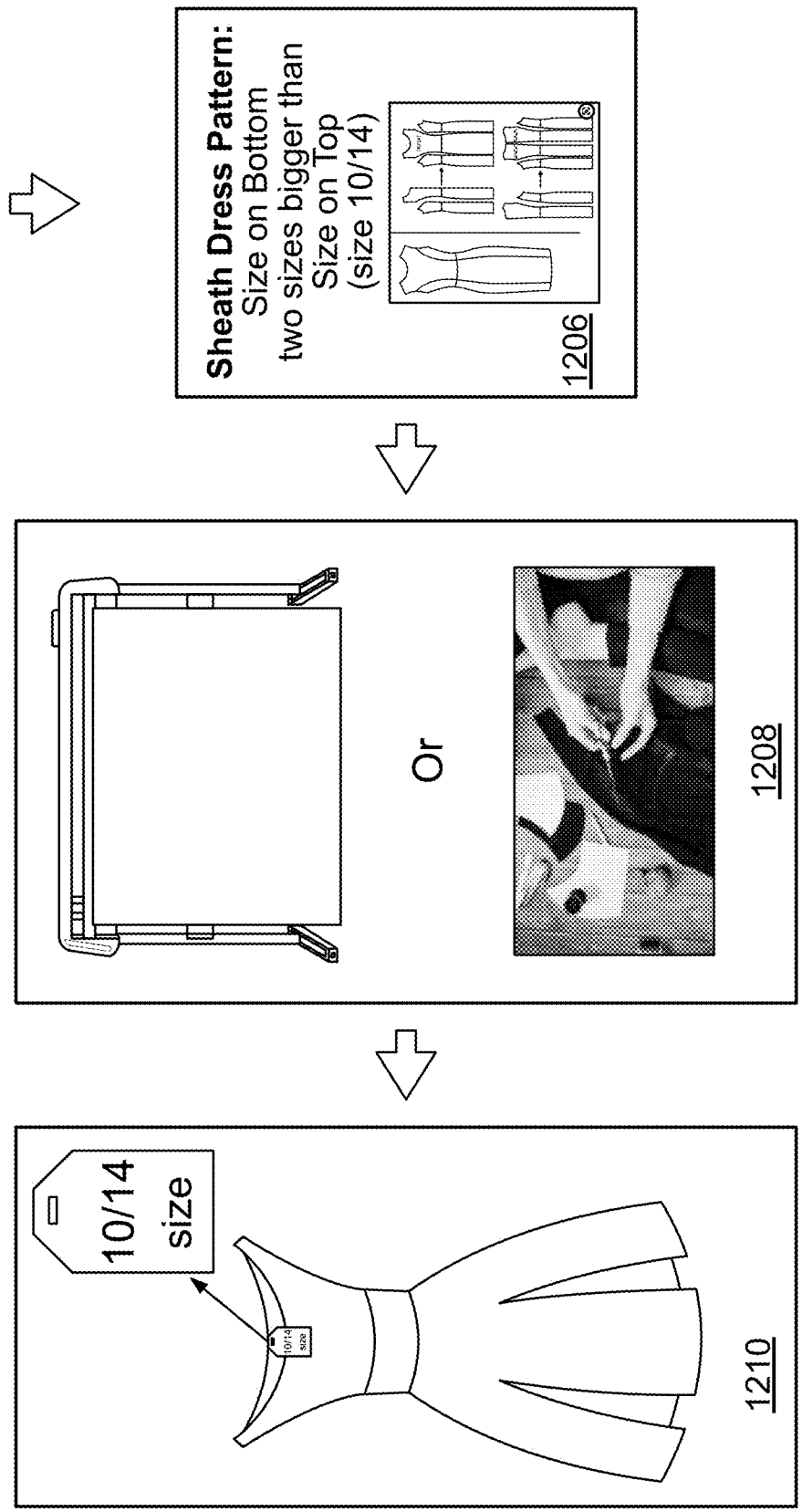

Referring again to FIG. 1, at step 110, the dual-size garment is produced, manufactured, tailored, or fabricated, by a person, automatically by a computerized machine, or a combination of both. The manufacturing or production process is also described in the context of FIG. 6. FIG. 12 illustrates another exemplary manufacturing process. Some steps in the illustration overlap with the previously described steps, and are included herein again for clarity of description. At step 1202, sizes from a dual-size chart that are closest to customer-specified measurements for an upper body size and a lower body size, are identified. At step 1204, the identified dual-size measurements are used to select a graded sheath dress pattern for the specified size differential. In an example, where the identified dual-size is 10/14, the size differential is two with a larger bottom. The graded sheath dress pattern of step 1204 is used at step 1206 for the size combination (10/14) to create a sheath dress pattern for the specified dual-size. At 1208, the dual-size garment is produced using the sheath dress pattern for the specified dual-size. In embodiments, the dual-size garment is produced by a person, automatically by a computerized machine, or a combination of both. At 1210, the dual-size garment is offered for sale.

Although the present specification has been described with particular focus on single piece garments for women, the present specification is also designed for men, children, transgender, or any other human. Dual-sized clothing solutions of the present specification have several advantages over the single-sized clothing processes that are currently used. In embodiments, the present specification results in a single garment that offers an improved fit because it accounts for two different sizes (one for the top, and one for the bottom). Further, embodiments of the present specification result in an improved fit over traditional sized garments since the dual-size garments can be manufactured in combination with traditional made-to-measure processes. By creating a dual-sized pattern, a designer can control the design details of the resulting dual-size garment and introduce design features such as pleats, gathers, or other fit adjusting sewing techniques that may not be needed in the single-size embodiment of the garment. In embodiments, the present specification references traditional sizes which is a familiar way in consumers' minds to assess fit and place an order. Embodiments of the present specification do not require the consumer to take any action which is not currently a standard consumer behavior (such as measuring themselves with a tape measure or body scanner) to place an order. Additionally, measuring with a tape measure or a body scanner are options for those who would prefer to do so. Embodiments of the present specification enable a seller to offer an option for a customer to place an order for a garment that is unavailable or out-of-stock, to be manufactured, produced, or custom-tailored. Moreover, embodiments of the present specification offer economies of scale because one pattern can be made and used for numerous different combinations of size on top and bottom, as long as the relative difference between the two sizes remains the same. Therefore, while made-to-measure garments manufacturing currently produces one garment at a time, the present specification allows for garments that fit better than traditional one size garments, comes close to fitting like made-to-measure garments, but allows for economies of scale in production.

The above examples are merely illustrative of the many applications of the systems and methods of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A system adapted to manufacture a garment, the system comprising:
a server comprising at least one processor and a non-transitory computer readable medium storing a plurality of programmatic instructions, wherein the at least one processor is configured to execute the plurality of programmatic instructions stored on the non-transitory computer readable medium, and wherein, when executed, the plurality of programmatic instructions:
generate data representative of one or more first sizes corresponding to a top portion of the garment and one or more second sizes corresponding to a bottom portion of the garment;
electronically transmit said data to at least one computing device remote from the server;
receive from the at least one computing device an order for the garment comprising at least a first measurement corresponding to an upper body of a person from the person's waist upwards and a second measurement corresponding to a lower body of the person from the person's waist downwards;
determine at least one of the one or more first sizes closest to the first measurement;
determine at least one of the one or more second sizes closest to the second measurement;
generate a digital pattern representative of the garment by combining the at least one of the one or more first sizes and the at least one of the one or more second sizes at a waist, wherein said combining is achieved by electronically interpolating a waist size based on the at least one of the one or more first sizes and the at least one of the one or more second sizes; and
cause the garment to be manufactured by transmitting the generated digital pattern to a manufacturer of the garment through a manufacturing interface.

2. The system of claim 1, wherein, when displayed, the data comprises a dual-size chart.

3. The system of claim 2, wherein, when executed, the plurality of programmatic instructions receive the first measurement corresponding to the upper body of the person by receiving a selection of a first portion of the dual-size chart and receiving a modification of a first value in said first portion of the dual-size chart, wherein said modified first value is indicative of the first measurement.

4. The system of claim 3, wherein, when executed, the plurality of programmatic instructions receive the second measurement corresponding to the lower body of the person by receiving a selection of a second portion of the dual-size chart and receiving a modification of a second value in said second portion of the dual-size chart, wherein said modified second value is indicative of the second measurement.

5. The system of claim 1, wherein the first measurement is different from all of the one or more first sizes.

6. The system of claim 1, wherein the second measurement is different from all of the one or more second sizes.

7. The system of claim 1, further comprising an original digital pattern formed by at least one of the one or more first sizes being combined with at least one of the one or more second sizes.

8. The system of claim 7, wherein, relative to the original digital pattern, the generated digital pattern has a same shape but a different size combination.

9. The system of claim 7, wherein, relative to the original digital pattern, the generated digital pattern has a same basic design but at least one of a top portion of the digital pattern or the bottom portion of the digital pattern has a different size.

10. The system of claim 1, wherein, when executed, the plurality of programmatic instructions further causes data representative of the generated digital pattern to be electronically transmitted to the at least one computing device.

11. The system of claim 1, wherein, when executed, the plurality of programmatic instructions further causes the data representative of the generated digital pattern to be displayed.

12. A method for manufacturing a garment, the method being implemented in a server comprising at least one processor and a non-transitory computer readable medium storing a plurality of programmatic instructions, wherein the at least one processor is configured to execute the plurality of programmatic instructions stored on the non-transitory computer readable medium, the method comprising:
generating data representative of one or more first sizes corresponding to a top portion of the garment and one or more second sizes corresponding to a bottom portion of the garment;
electronically transmitting said data to at least one computing device remote from the server;
receiving from the at least one computing device an order for the garment comprising at least a first measurement corresponding to an upper body of a person from the person's waist upwards and a second measurement corresponding to a lower body of the person from the person's waist downwards;
determining at least one of the one or more first sizes closest to the first measurement;
determining at least one of the one or more second sizes closest to the second measurement;
generating a digital pattern representative of the garment by combining the at least one of the one or more first sizes and the at least one of the one or more second sizes at a waist, wherein said combining is achieved by electronically interpolating a waist size based on the at least one of the one or more first sizes and the at least one of the one or more second sizes; and
causing the garment to be manufactured by transmitting the generated digital pattern to a manufacturer of the garment through a manufacturing interface.

13. The method of claim 12, wherein, when displayed, the data comprises a dual-size chart.

14. The method of claim 13, wherein the receiving of the first measurement corresponding to the upper body of the person comprises receiving a selection of a first portion of the dual-size chart and receiving a modification of a first value in said first portion of the dual-size chart, wherein said modified first value is indicative of the first measurement.

15. The method of claim 14, wherein the receiving of the second measurement corresponding to the lower body of the person comprises receiving a selection of a second portion of the dual-size chart and receiving a modification of a second value in said second portion of the dual-size chart, wherein said modified second value is indicative of the second measurement.

16. The method of claim 12, wherein the first measurement is different from the one or more first sizes.

17. The method of claim 12, wherein the second measurement is different from the one or more second sizes.

18. The method of claim 12, further comprising forming an original digital pattern by at least one of the one or more first sizes being combined with at least one of the one or more second sizes.

19. The method of claim 18, wherein, relative to the original digital pattern, the generated digital pattern has a same shape but at least one of a top portion of the digital pattern or the bottom portion of the digital pattern has a different size.

20. The method of claim 12, further comprising causing data representative of the generated digital pattern to be electronically transmitted to the at least one computing device.

21. The method of claim 12, further comprising causing the data representative of the generated digital pattern to be displayed.

* * * * *